United States Patent
Bode

(10) Patent No.: US 9,145,314 B2
(45) Date of Patent: Sep. 29, 2015

(54) DEVICE FOR INOCULATING A FLUID CONDUCTED THROUGH PIPES

(75) Inventor: Olaf Bode, Bad Camberg (DE)

(73) Assignee: ROTHENBERGER AG, Kelkheim (DE)

( * ) Notice: Subject to any disclaimer, the term of this patent is extended or adjusted under 35 U.S.C. 154(b) by 720 days.

(21) Appl. No.: 13/415,882

(22) Filed: Mar. 9, 2012

(65) Prior Publication Data

US 2012/0227832 A1 Sep. 13, 2012

(30) Foreign Application Priority Data

Mar. 9, 2011 (DE) .......................... 10 2011 001 166

(51) Int. Cl.
B08B 9/032 (2006.01)
C02F 1/68 (2006.01)
F04F 5/00 (2006.01)

(52) U.S. Cl.
CPC ................. *C02F 1/686* (2013.01); *B08B 9/032* (2013.01); *F04F 5/00* (2013.01); *C02F 2201/002* (2013.01); *Y10T 137/4245* (2015.04)

(58) Field of Classification Search
CPC ................. F04F 5/00; F04F 5/02; F04F 5/24; C02F 1/686; Y10T 137/4245; Y10T 137/86075; B08B 9/032; B08B 9/0321
USPC ................... 137/565.22, 592, 590, 238, 240; 251/144
See application file for complete search history.

(56) References Cited

U.S. PATENT DOCUMENTS

| 3,982,589 | A | * | 9/1976 | Wilson et al. ................... 166/53 |
| 4,919,163 | A | * | 4/1990 | Rosenberg .................... 137/238 |
| 4,924,908 | A | * | 5/1990 | Weiland et al. ........... 137/565.22 |
| 6,177,018 | B1 | * | 1/2001 | Ruppenthal ................... 210/739 |

FOREIGN PATENT DOCUMENTS

| DE | 1242575 B | 6/1967 |
| DE | 3400263 A1 | 7/1985 |
| DE | 3715010 C2 | 5/1995 |
| DE | 19639666 C1 | 6/1998 |
| JP | 61219701 A | 9/1986 |

* cited by examiner

*Primary Examiner* — Kevin Lee
(74) *Attorney, Agent, or Firm* — Leydig, Voit & Mayer, Ltd.

(57) ABSTRACT

A device for inoculating fluid conducted through pipes includes a reservoir configured to hold an inoculant. The reservoir includes an outlet through which the inoculant is feedable to at least one of the pipes and an inlet configured to route compressed air into an interior of the reservoir.

9 Claims, 3 Drawing Sheets

DEVICE FOR INOCULATING A FLUID CONDUCTED THROUGH PIPES

CROSS-REFERENCE TO PRIOR APPLICATION

Priority is claimed to German Patent Application No. DE 10 2011 001 166.8, filed on Mar. 9, 2011, the entire disclosure of which is hereby incorporated by reference herein.

FIELD

The invention concerns a device for inoculating a fluid conducted through pipes, with a reservoir for holding the inoculant, with the reservoir having an outlet for the inoculant via which the inoculant can be conducted into at least one of the pipes.

BACKGROUND

A device for inoculating a fluid conducted through pipes is described in DE 1 242 575 A1. The device is used to inoculate water flowing, e.g., through the piping of a water supply system. The device has a reservoir of the flexible bag type, filled with inoculant. In order to transport the inoculant from the reservoir, the device uses the energy of the water's flow. For this purpose, a throttle plate is incorporated into the cross-section of the pipe through which the water flows. However, the throttle plate narrows the pipe's cross-section. This favors deposits in the throttle plate area, which interrupt the transport mechanism for the inoculant, having a negative impact on the function of the device.

SUMMARY

In an embodiment, the present invention provides a device for inoculating fluid conducted through pipes including a reservoir configured to hold an inoculant. The reservoir includes an outlet through which the inoculant is feedable to at least one of the pipes and an inlet configured to route compressed air into an interior of the reservoir.

BRIEF DESCRIPTION OF THE DRAWINGS

The present invention will be described in even greater detail below based on the exemplary figures. The invention is not limited to the exemplary embodiments. Features described and/or represented in the various figures can be used alone or combined in embodiments of the present invention. Other features and advantages of various embodiments of the present invention will become apparent by reading the following detailed description with reference to the attached drawings which illustrate the following.

DETAILED DESCRIPTION

Figure 1:
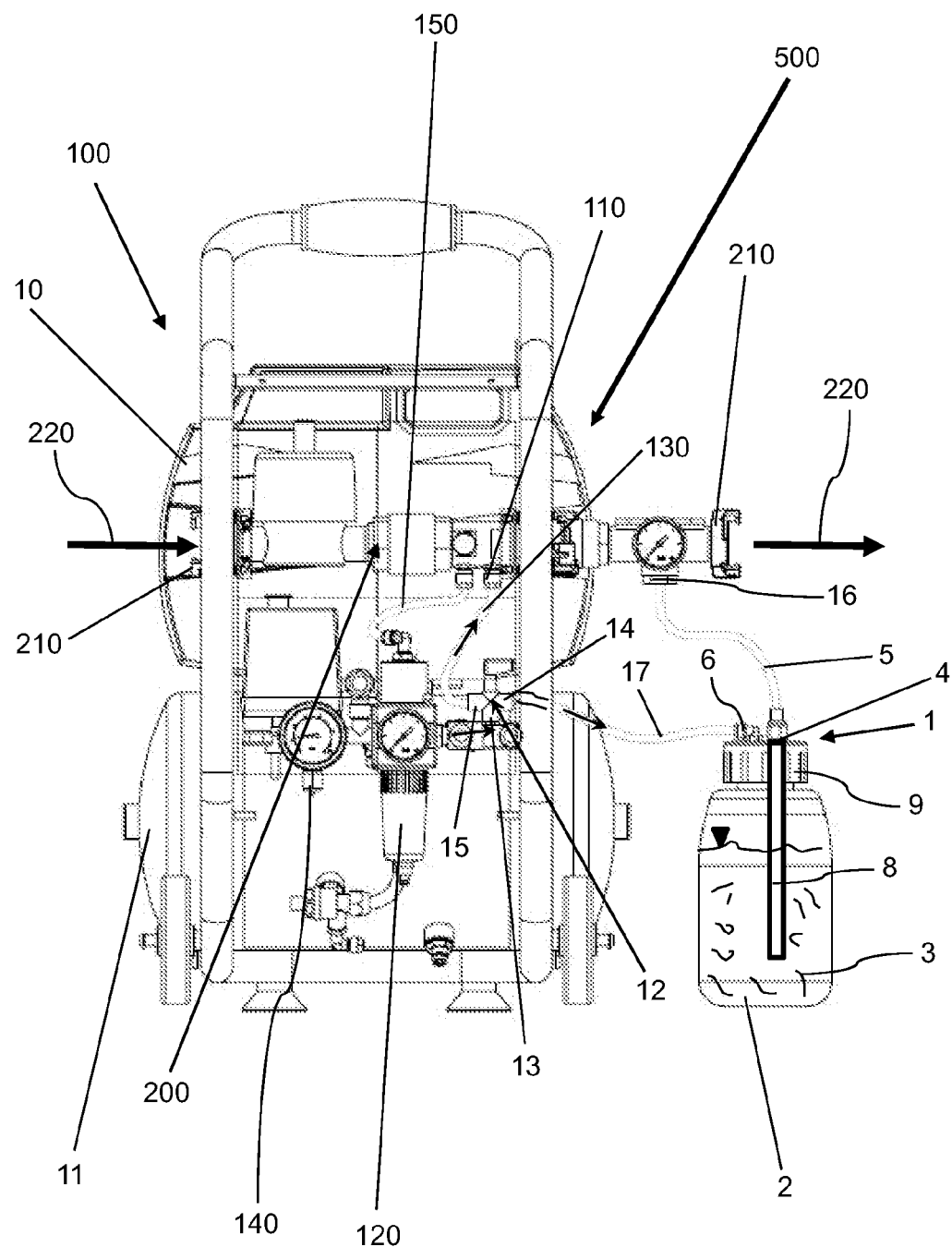
FIG. 1 shows an exemplary embodiment of a device for inoculating fluid conducted through pipes as part of a combination device with a device for flushing piping in a side view.

In an embodiment, the present invention provides a device with the characteristics mentioned initially for inoculating a fluid conducted through pipes, by means of which device the fluid can be inoculated in a reliable and technologically simple manner.

A device according to an embodiment of the invention for inoculating a fluid conducted through pipes has a reservoir for holding an inoculant. The reservoir has an outlet for the inoculant via which the inoculant can be conducted into at least one of the pipes.

The reservoir is preferably embodied to hold an inoculant used to decalcify and/or disinfect the fluid or the pipes. In addition, the reservoir is embodied to hold an inoculant containing inhibitors. The inhibitors can be effective against lime scale, corrosion, bacterial or fungal infestations, and/or frost. As a disinfectant, the inoculant may contain, e.g., hydrogen peroxide, sodium hypochlorite solution, and/or chlorine dioxide.

The device is preferably suitable for using the reservoir filled with such an inoculant to inoculate the fluid conducted through the pipes. Such a fluid flowing through the pipes can be water; in particular, tap water. Basically, the fluid may be any type of liquid medium. The fluid may also be a gas or vapor. In addition, a liquid-gas mix can also be a fluid.

A device according to an embodiment of the invention for inoculating fluid conducted through pipes is characterized, among others, by the fact that the reservoir has an inlet used to add compressed air into the interior of the reservoir filled with the inoculant.

By means of this measure, a transport mechanism for the inoculant is realized in a technologically simple manner. The inoculant is transported out of the reservoir by pressurizing the reservoir with compressed air, pushing the inoculant from the reservoir via the outlet.

The compressed air can be generated by an external source and/or stored in an internal accumulator from which the reservoir is pressurized with compressed air via the inlet when necessary.

The device itself can also have a mechanism for generating compressed air and/or a device for storing compressed air through which the reservoir can be pressurized with compressed air.

A device according to an embodiment of the invention for inoculating fluid conducted through pipes is characterized by the fact, among others, that for transporting the inoculant, a jet pump is used whose suction inlet interacts with the reservoir outlet, and whose outlet can be connected with one of the pipes for flow.

In the context of the invention, the jet pump is to be understood as a pump in which the pumping effect is generated by a fluid jet as a propellant, with the fluid jet suctioning, accelerating and transporting another medium, i.e., the suctioned medium. By using, according to an embodiment of the invention, such a jet pump, transporting the inoculant is possible with the least technological effort and thus, lowest cost. This also implements a particularly low-maintenance device for inoculating fluid conducted through pipes, henceforth also called an inoculating device, since the jet pump itself is especially low maintenance due to its lack of movable parts. In addition, a jet pump allows transporting the inoculant without electrical components and thus, independently of any electrical loads so that the inoculating device can be used in locations lacking a power supply. The measure according to an embodiment of the invention thus allows inoculating the fluid reliably. It also allows inoculating the fluid in a technological simple manner.

One embodiment of the invention provides for the jet pump to be connectable with its propellant inlet to at least one of the pipes for a flow. Thus, the flow of the fluid flowing through the pipes will serve as the propellant for the jet pump. This allows transporting the inoculant in a particularly simple manner and with particularly low effort since additional devices for generating a fluid jet as a propellant are not necessary.

The flow connection of jet pump and the one pipe can be realized by means of an outlet that can be attached to the pipe and which outlet is connected with the propellant inlet of the jet pump by means of a line. In order to use the flow of the fluid flowing through the pipes for transporting the inoculant, the diameter of the piping through which the fluid flows remains unchanged. This will result in an advantage over the inoculating device known so far, which, for using the flow conducted through the pipe, provides for a throttle plate located within the pipe diameter thus causing a significant effect on the flow.

The reservoir can be embodied as pressure-proof. If the inoculating device uses compressed air for transporting the inoculant, this will ensure that in the reservoir interior a positive pressure can build up from the compressed air that will have an effect on the inoculant, pushing or transporting the inoculant outside via the outlet.

If a jet pump has been provided for transporting the inoculant, the reservoir may be made of a flexible material, in particular, an elastic material. Preferably, the reservoir should be stable in its form in order to ensure easy handling, such as when the reservoir is filled with inoculant.

Preferably, the container should additionally possess at least one vent valve; e.g. for preventing the jet pump from working against a vacuum.

Preferably, the pressure-proof reservoir is embodied from plastic, glass or metal.

According to one embodiment of the invention, it is provided for the reservoir to have a lid part removably closing off a fill opening for the inoculant. This will allow filling the reservoir with inoculant in an easy manner by removing the reservoir from the lid part, making the fill opening accessible.

According to another embodiment of the invention, it is provided for the inlet and/or the outlet of the reservoir to be located on a lid part to which the reservoir is removably connected. This allows exchanging the reservoir, such as exchanging an empty reservoir for a full reservoir, or a reservoir filled with one inoculant for one filled with a different inoculant without having to go through the effort of having to remove the inlet or outlet from the reservoir. It is merely necessary to remove the reservoir from the lid part. This is advantageous for exchanging the reservoir.

The lid part with the inlet and/or the outlet can simultaneously be the lid part that removably closes off the reservoir's fill opening or a fill opening of the reservoir.

The reservoir and the lid part can form a twist closure with each other so that the reservoir can be screwed into the lid part.

It is also possible for the lid part and the reservoir to form a bayonet closure.

Preferably, lid part and reservoir should form a tight seal. For this purpose, a sealing element, such as a type of sealing ring, may be provided, being arranged between lid part and reservoir and creating a tight seal when lid part and reservoir are mated.

A device according to an embodiment of the invention for inoculating fluid conducted through pipes is characterized by, among others, at least one capillary being provided through which the inoculant is conducted, and particularly, through which it flows, during inoculation.

In the context of the invention, the capillary is to be understood as a longitudinally extending channel or passage dimensioned rather small in its diameter, which will cause the capillary to have a throttle effect when conducting the inoculant.

The throttle effect of the capillary allows metering the inoculant in a technologically simple and especially cost-effective manner. Due to the considerable throttle effect of the capillary, the inoculant can be metered into the fluid flowing through the pipes in such a manner that the inoculant is added relatively slowly and uniformly to the fluid to be inoculated.

Through dimensioning the capillary regarding its length and dimension of diameter, the amount of inoculant added to the fluid per time unit can be individually and flexibly adjusted to a desired metering amount and a desired mass flow.

The capillary can be embodied as a thin tube.

The capillary can be embodied as a thin tube with a length between about 50 mm and about 400 mm, in particular, with a length of about 150 mm to about 200 mm, preferably with a length of about 175 mm. Preferably, the interior diameter of the thin tube should be about 0.3 mm to about 1.0 mm, preferably about 0.7 mm.

The capillary can be arranged at least partially within the reservoir. This would protect the capillary and ensure its permanent capillary effect.

Preferably, the capillary should extend all the way to or close to the bottom area of the reservoir. This will ensure that the inoculant can get into the capillary even if the inoculant fill level in the reservoir is low.

The capillary can be connected to the outlet of the reservoir. Thus, the capillary will be located in a defined position regarding the outlet. In this regard, the outlet will serve as the attachment point for the capillary.

Preferably, the capillary should be removably attached to the outlet so that a damaged capillary can be exchanged for a new capillary or for a capillary with different dimensions in a simple manner.

Preferably, the capillary shall be a plastic part, in particular, an injection-molded part. This allows falling back on mass-produced, particularly cost-effective components.

According to an embodiment, the invention provides a reservoir of the type described above that is suitable for a device for inoculating a fluid conducted through pipes, in particular, an inoculating device as described above.

In addition, another embodiment of the invention provides a capillary of the type described above that is suitable for a device for inoculating a fluid conducted through pipes, in particular, an inoculating device as described above.

According to a further embodiment, the invention provides a combination device with an inoculating device of the type described above and a device for flushing piping. Such a combination device has a dual function. For one, such a combination device allows inoculating of the fluid conducted through the piping using an inoculant, such as a descalant, disinfectant and/or other inoculant possessing an inhibiting effect. And secondly, it allows flushing the piping or pipes through which the fluid is flowing, freeing them from deposits or clogs or such.

The combination device is particularly suited for use in the piping of water supply systems, in particular, for domestic tap water supply piping.

Advantageously, the combination device shares a device for generating compressed air and/or a device for storing compressed air, whose compressed air is used either to flush the pipes or to transport the inoculant from the reservoir. This allows using a single device with regard to generating compressed air or storing compressed air used for both devices of the combination device.

Preferably, the combination device has a valve whose inlet can be pressurized with compressed air and via whose first outlet the reservoir fillable or filled with inoculant, and via whose second outlet the piping to be flushed will be supplied with compressed air. This allows a particularly simple manner of pressurizing the device for inoculating the fluid conducted through pipes and/or the device for flushing pipes with compressed air.

The valve can be manually operable. The valve can also be electrically controllable.

The valve's first outlet, second outlet, and any neutral position, if available, can alternately be set to an open position.

An embodiment of the invention allows inoculating a fluid conducted through pipes using an inoculant in a technologically simple and cost-effective manner without an additional electronic system being required. According to an embodiment of the invention, the principle of the jet pump for transporting the inoculant, or compressed air is used. The compressed air is, e.g., stored in a different device for cleaning the pipes through which the fluid is conducted and is thus also available for the inoculating device by way of the combination device according to an embodiment of the invention. As a complement or alternative, a capillary is used for adding the inoculant in a metered manner to the fluid flowing through the piping.

FIG. 1 shows a possible embodiment of a combination device, 500, comprising a possible embodiment of a device, 1, for inoculating fluid conducted through pipes and a device, 100, for flushing piping.

Device 1 for inoculating fluid conducted through pipes, henceforth called inoculating device, and device 100 for flushing piping, henceforth called flushing device, act on a shared pipe section, 200. Pipe section 200 has at its inlet-side and at its outlet-side one connecting location, 210, each, by means of which, e.g., via flexible line sections, pipe section 200 can be connected to a piping system, such as to a water supply system. When pipe section 200 is coupled with the piping system, the fluid flowing through the piping will flow through pipe section 200, e.g., in the direction according to arrows 220.

Pipe section 200 has at least one inoculating location, 16, embodied by an inlet. A supply line, 5, of inoculating device 1 is connectable or connected to inoculating location 16 or to the inlet. The section of pipe section 200 in which inoculating location 16 is provided can be permanently connected to pipe section 200. It is further possible that the section with inoculating location 16 is removably connected to pipe section 200.

Inoculating device 1 has a reservoir, 2, holding inoculant, 3. Reservoir 2 is pressure-proof and preferably made of plastic. Reservoir 2 is open at the top and closed by a lid part, 9, e.g., by means of a twist closure. An outlet, 4, is arranged on lid part 9 which outlet is connected to the exterior by supply line 5.

In addition, outlet 4 is connected to a capillary, 8, in particular, removably connected. Capillary 8 extends into the interior, 7, of reservoir 2. Preferably, capillary 8 will be of such a length that, with lid part 9 mounted on reservoir 2, capillary 8 will extend to the bottom area of the reservoir.

Capillary 8 is preferably embodied as a thin tube with an interior diameter of about 0.3 mm to about 1.0 mm.

On lid part 6, an inlet, 6, is arranged via which reservoir 2 can be pressurized using compressed air. If reservoir 2 is pressurized using compressed air, a positive pressure is generated in interior 7 of reservoir 2, by means of which inoculant 3 is pushed into capillary 8, from where it flows into pipe section 200 via line 5 and inoculating location 16.

The compressed air for inoculating device 1 is provided by a compressed air generating device, 10, and an accumulator, 11, which are both preferably integral components of flushing device 100. Via a pre-set filter pressure regulator, 120, the compressed air is fed from accumulator 11 to an inlet, 13, of a valve, 12, and arrives via the valve's first outlet, 14, and line, 17, at inlet 6 of reservoir 2. In addition, via a second outlet, 15, of valve 12, the compressed air arrives via a line, 130, at an injection location, 110, for compressed air located in pipe section 200.

Preferably, valve 12 can be actuated manually so that, by actuating valve 12, the compressed air is either fed to inoculating device 1 via first outlet 14, or to injection location 110 via second outlet 15 for flushing the piping.

In addition, a pressure gauge, 140, is provided which is preferably arranged upstream—as seen from the direction of flow—from filter pressure regulator 120 and which is used to temporarily indicate the positive pressure of the compressed air upstream from filter pressure regulator 120. Filter pressure regulator 120 is connected with pipe section 220 via a line, 150, to allow adjusting the starting pressure of filter pressure regulator 120 in interdependence with the pressure of the fluid in pipe section 200. Preferably, the starting pressure of the compressed air is set by about 1 bar higher than the pressure of the fluid in pipe section 200.

Figure 2:
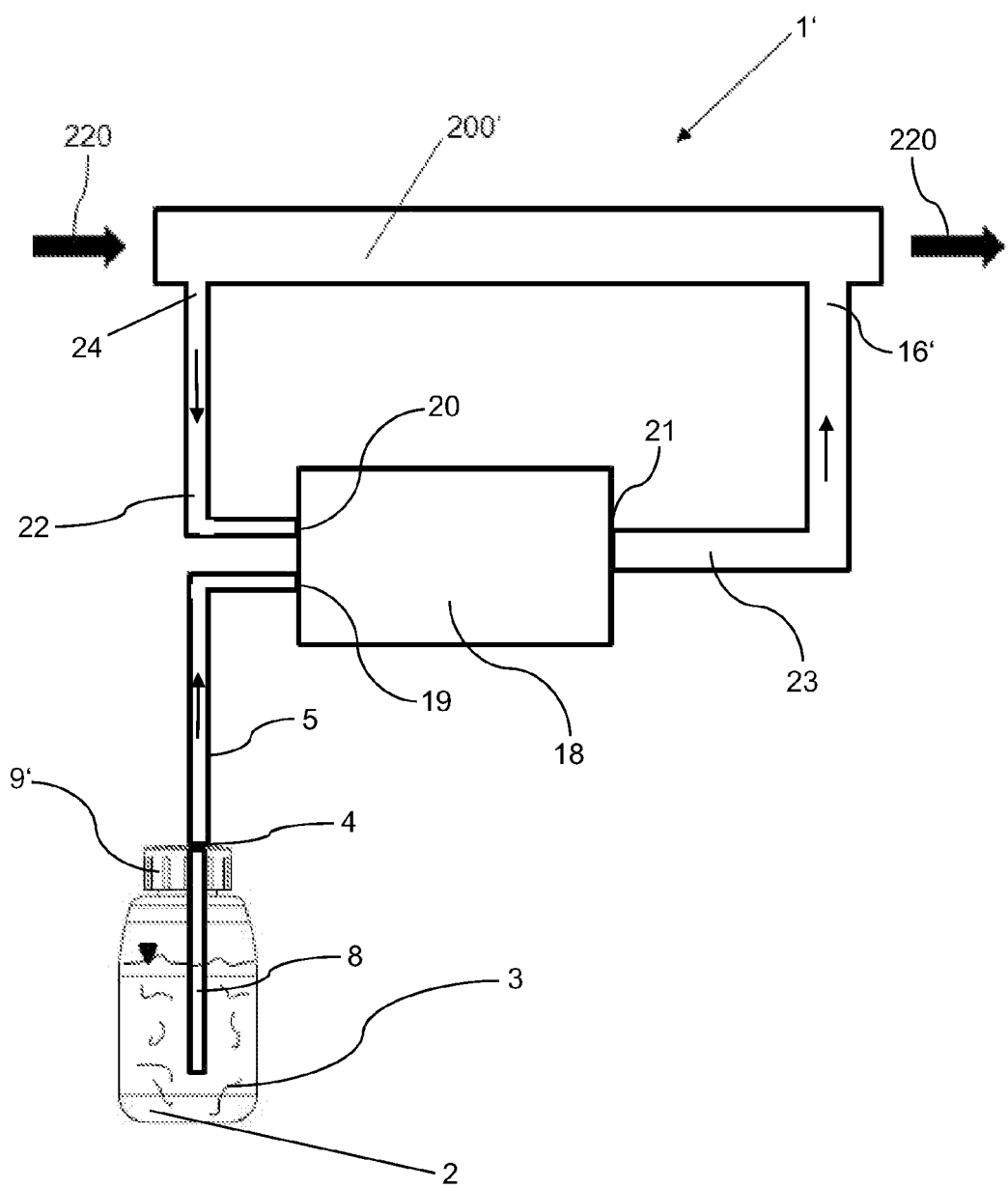
FIG. 2 shows another embodiment of a device for inoculating fluid conducted through pipes as a schematic view.

FIG. 2 shows an additional possible embodiment of a device, 1', for inoculating fluid conducted through pipes. Inoculating device 1' according to FIG. 2 is distinguished from inoculating device 1 according to FIG. 1 by, among others, the fact that a jet pump, 18, is provided for transporting inoculant 3 located in reservoir 2. Jet pump 18 has a suction inlet, 19, and a propellant inlet, 20, as well as an outlet, 21. Suction inlet 19 is connected with outlet 4 of lid part 9 of reservoir 2 via line 5. Lid part 9 according to FIG. 2, as compared lid part 9 of FIG. 1, preferably has only outlet 4, via which capillary 8 extends into reservoir 2 into inoculant 3.

Inoculating device 1' with its jet pump 18 exerts an effect on pipe section 200', through which a fluid to be inoculated flows. The fluid preferably flows through pipe section 200 in the direction of arrow 220. Pipe section 200' has an inoculating location, 16', via which the inoculant is added to pipe section 200. In addition, pipe section 200 has a removal location, 24, via which a partial flow of the fluid is removable.

For transporting inoculant 3, jet pump 18 preferably uses the fluid flowing through pipe section 200' in the direction of arrow 220, of which fluid a partial flow is removed via the removal location by means of a line, 22, and supplied to propellant inlet 20 of jet pump 18. Outlet 21 of jet pump 18 is connected to inoculating location 16 of pipe section 200' via a line, 23, so that at inoculating location 16 (sic), the removed partial flow of the fluid is added to pipe section 200' together with the partial flow of inoculant 3 transported from reservoir 2.

Figure 3:
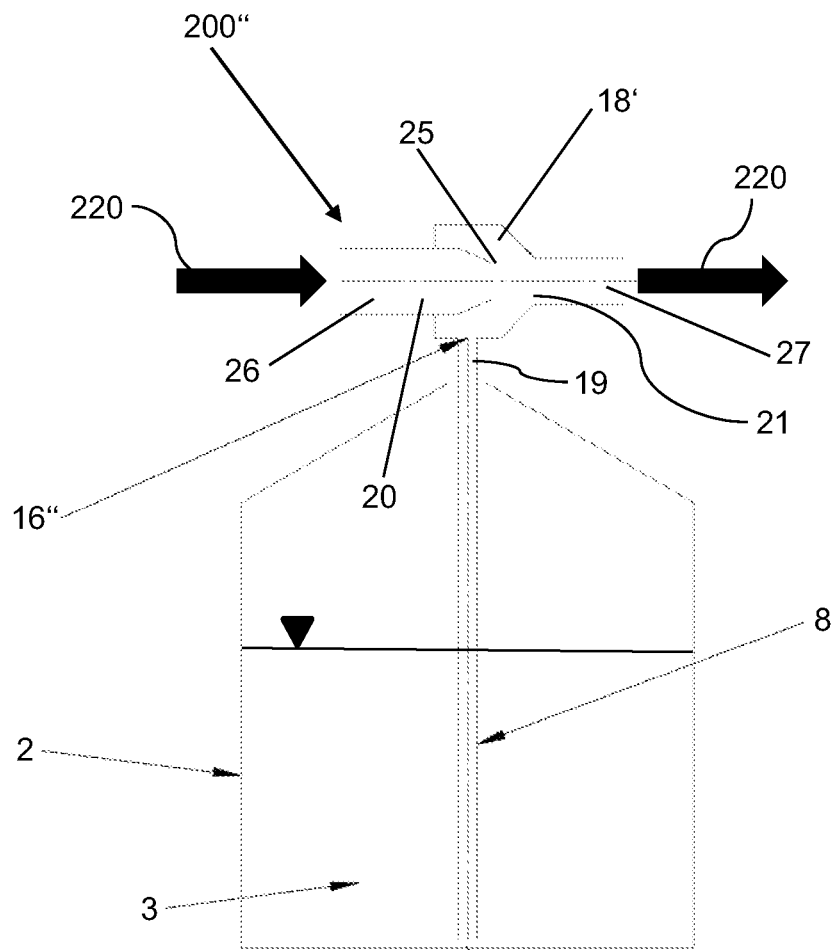
FIG. 3 shows an additional embodiment of a device for inoculating fluid conducted through pipes as a schematic view.

FIG. 3 shows an additional embodiment of a device, 1", for inoculating fluid conducted through pipes. Components of inoculating device 1" according to FIG. 3 that are identical with or have the same function as components of inoculating device 1 according to FIG. 1 and/or inoculating device 1' according to FIG. 2 are identified using the same reference symbols; in this regard, reference is made to the description for inoculating device 1 according to FIG. 1 and inoculating device 1' of FIG. 2.

Inoculating device 1" according to FIG. 3 is distinguished from inoculating device 1' according to FIG. 2 among others by the fact that a pipe section, 200", through which the fluid flows, is provided in which a jet pump 18' has already been integrated. In inoculating device 1", the fluid completely flows through jet pump 18'. Jet pump 18' has a nozzle area, 25, that is embodied by a part, 26, of pipe section 200", which part has a cross-section that is reduced in its diameter. Part 26 of pipe section 200" thus embodies propellant inlet 20 of jet pump 18'.

With its outlet 21, jet pump 18' flows into a part, 27, adjacent to part 26 of pipe section 200". In addition, inoculating location 16" of pipe section 200 is embodied by suction inlet 19 of jet pump 18".

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE SYMBOLS

1 Inoculating device
1' Inoculating device
1" Inoculating device
2 Reservoir
3 Inoculant
4 Outlet
5 Supply line
6 Inlet
7 Interior
8 Capillary
9 Lid part
9' Lid part
10 Compressed air generating device
11 Accumulator
12 Valve
13 Inlet
14 1st outlet
15 2nd outlet
16 Inoculating location
16' Inoculating location
16" Inoculating location
17 Line
18 Jet pump
18' Jet pump
19 Suction inlet
20 Propellant inlet
21 Outlet 11
22 Line
23 Line
24 Removal location
25 Jet area
26 Part
27 Part
100 Flushing device
110 Injection location
120 Filter pressure regulator
130 Line
140 Pressure gauge
150 Line
200 Pipe section
200' Pipe section
200" Pipe section
210 Connecting location
220 Arrow
500 Combination device

The invention claimed is:

1. A device for inoculating fluid conducted through pipes comprising:
   a reservoir configured to hold an inoculant,
   the reservoir including an outlet through which the inoculant is feedable to at least one of the pipes; and
   a jet pump configured to transport the inoculant, the jet pump including a suction inlet configured to interact with the outlet of the reservoir and an outlet configured to connect to a fluid flow in the at least one of the pipes, the jet pump being arranged outside of the pipes carrying the fluid to be inoculated and including a propellant inlet connected to a line that branches off from one of the pipes.

2. The device according to claim 1, further comprising at least one capillary configured to conduct the inoculant during inoculation.

3. The device according to claim 2, wherein the at least one capillary is at least partially disposed inside the reservoir.

4. The device according to claim 3, wherein the at least one capillary extends to a bottom area of the reservoir.

5. The device according to claim 2, wherein the at least one capillary is removably connectable to the outlet of the reservoir.

6. A combination device, comprising:
   a device for inoculating fluid conducted through pipes comprising a reservoir configured to hold an inoculant, the reservoir including an outlet through which the inoculant is feedable to at least one of the pipes and an inlet configured to feed compressed air into an interior of the reservoir;
   a flushing device configured to flush the pipes; and
   at least one of a shared device for generating compressed air and a shared device for storing compressed air that is configured to alternatively provide the compressed air for one of flushing the piping and transporting the inoculant from the reservoir.

7. A combination device, comprising:
   a device for inoculating fluid conducted through pipes comprising a reservoir configured to hold an inoculant, the reservoir including an outlet through which the inoculant is feedable to at least one of the pipes and an inlet configured to feed compressed air into an interior of the reservoir;
   a flushing device configured to flush the pipes; and
   a valve having an inlet, a first outlet and a second outlet, wherein the inlet is configured to receive the compressed air, the first outlet is configured to provide the compressed air to the reservoir and the second outlet is configured to provide the compressed air to the pipes to be flushed.

8. The combination device according to claim 7, wherein the valve is moveable, alternatively, between a first open position with the first outlet and a second open position with the second outlet.

9. The combination device according to claim 8, wherein the valve is moveable to a neutral position.

* * * * *